Aug. 8, 1950     E. SALL     2,517,718

FOLLOW-UP PRESSURE FLUID SERVOMOTOR

Filed April 24, 1946

ERIK SÄLL
INVENTOR
By Richardson and David
ATTYS.

Patented Aug. 8, 1950

2,517,718

UNITED STATES PATENT OFFICE 2,517,718

FOLLOW-UP PRESSURE FLUID SERVOMOTOR

Erik Säll, Stockholm, Sweden, assignor to Aktiebolaget A. Ekströms Maskinaffär, Stockholm, Sweden, a joint-stock company of Sweden Application April 24, 1946, Serial No. 664,479
In Sweden November 30, 1943

5 Claims. (Cl. 60—52)

For automatic adjustment of valves, rheostats or the like for control of liquids, gases, temperatures, electric currents and so on a return device is in many cases necessary, in order to avoid the control member (valve or the like) being adjusted more than necessary and to return the control aggregate to the position of equilibrium (the initial position). Particularly in those cases where a certain time elapses from the adjustment of the control member and until the change of this adjustment has made itself felt in the member receiving the impulses of the variations (the impulse member) it is of importance that the control member is not adjusted more than necessary for restoring the equilibrium in the control procedure in order to avoid over-control and oscillation.

The present invention relates to such control device with gentle return and with an impulse member independent thereof, which impulse member by means of gas or liquid pressure actuates a relay in one direction, which relay actuates a servo-motor device consisting e. g. of a pressure cylinder with piston, reversible motor, membrane or the like for actuation of control means, which control means is substantially characterized therein that the relay which consists of an air dome provided with a float and at least one open return chamber communicating with the said dome, is adapted to be actuated by a liquid fluid in the direction opposite to said gas or liquid pressure, which fluid is actuated by and obtains its movement from the servo-motor device, the return chamber communicating with a vessel with means for keeping a substantially constant liquid level therein.

Figure 1:
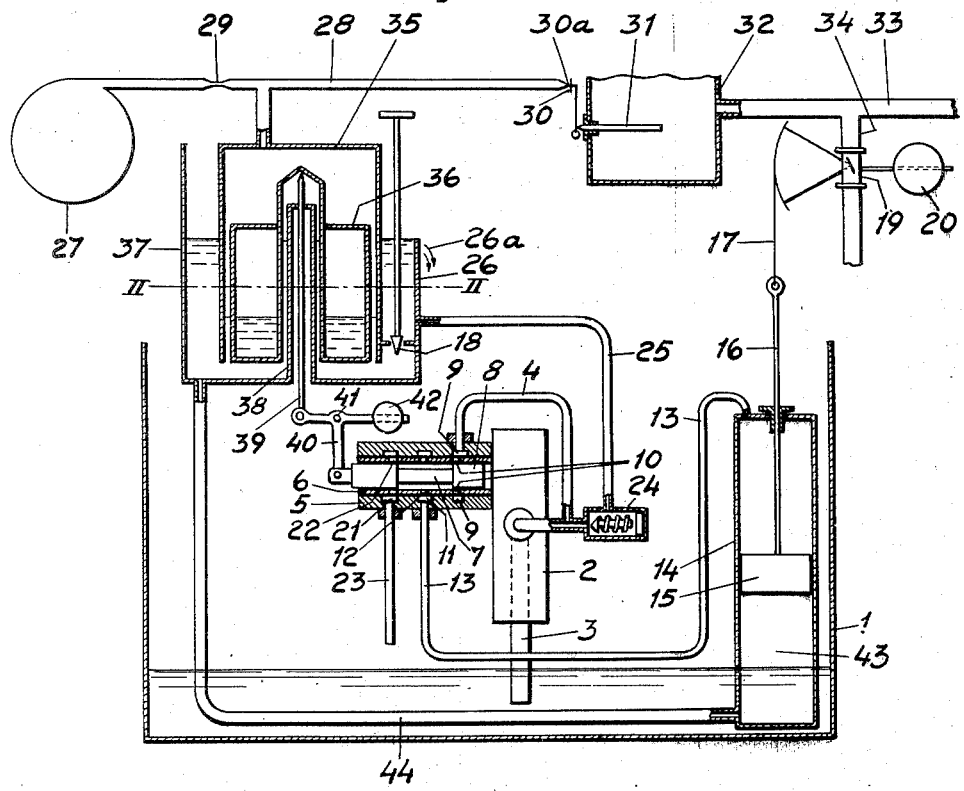
Figure 2:
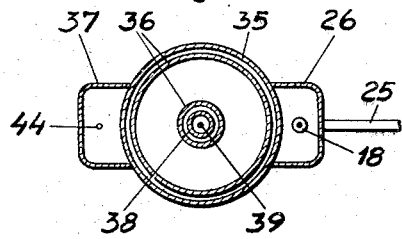

An embodiment selected as example of a control device according to the invention is illustrated diagrammatically in Fig. 1 of the accompanying drawing, and Fig. 2 is a view on the lines II—II of Fig. 1.

I is an oil tank, 2 an oil pump (gear pump) delivering oil to the apparatus, 3 the suction pipe of the gear pump and 4 the pressure pipe of the pump through which oil is led to a valve. Said valve consists of the valve casing 5, a rotatable sleeve 6 which is formed in one of the axle journals of the pump and thus rotates, and a round slide 7 consisting of two piston parts 8 connected with a narrow intermediate portion. As the slide 7, 8 is arranged in a rotating sleeve 6, the friction resistance is reduced at the displacement of the slide. An annular channel 9 in the valve casing and apertures 10 in the rotatable sleeve communicate with the pump through the pipe line 4. Another annular channel 21 in the valve casing and apertures 22 in the rotating sleeve communicate with an oil outlet pipe 23. An annular channel 11 in the valve casing and apertures 12 in the rotatable sleeve communicate with a servo-motor through a pipe line 13, said servo-motor consisting in the embodiment shown of a pressure cylinder 14 with a piston 15 connected with a rod 16 which by means of a wire 17 is connected with the control member, in this case a control valve 19 which is loaded by a counterweight 20. 24 is a spring-loaded overflow valve mounted in the pressure pipe of the pump for setting the desired pressure therein. The surplus of the pumped-up oil, i. e. of the oil not flowing into the pressure cylinder 14, flows through a pipe line 25 to a constant level vessel 26. 27 is a fan which presses air through a pipe line 28. Said pipe line is provided with a constricted portion 29 which is preferably dimensoned in such a way that the air pressure in the pipe line becomes about half as high as before the same. The outflow of the air from the pipe line at the outflow nozzle 30a is more or less checked by a valve 30 which is actuated by a thermostat 31 mounted in a vessel 32 in which the temperature is to be controlled. Cold liquid is supplied to the vessel through a pipe line 33 and hot liquid through a pipe line controlled by the control valve 19. The pipe line 28 communicates with an air dome 35 in an intermediate relay, which in this example, besides the air dome, consists of a float 36, a return chamber 37, the seal 38 which prevents the outflow of the air and the oil through the opening for the float rod 39 extending through the bottom of the air dome. The float 36 is connected to the slide 7 by means of the rod 39 and an angle arm 40 pivoted at 41. A counterweight 42 maintains the equilibrium of the float. The return chamber 37 and the air dome 35 communicate with one another and with the constant level vessel 26 through the throttle valve 18. The chamber 43 below the piston in the cylinder 14 is filled with a non-compressible liquid and communicates with the return chamber and the air dome through the return pipe line 44.

The described device operates in the following manner:

When the slide 7 assumes the position shown in the drawing the apertures 10 and 22 in the rotatable sleeve are shut off by the piston portions 8 of the slide. The valve assumes this position when the temperature in the vessel 32 is normal (the desired temperature). The oil sucked by the pump through the pipe 3 from the oil store in the casing 1 and fed to the pipe line 4 thus cannot pass through the slide 7 and the apertures 10, but leaves through the overflow valve 24 which opens at a certain pressure limit so that the oil leaves through the pipe line 25 to the constant level vessel 26, from where it flows down into the oil tank as indicated by the arrows 26a. Nor can the oil in the cylinder 14 leave through the sleeve and the slide, and therefore the apparatus has a stable position, i. e. position of equilibrium. The level in the return chamber 37 is then the same as in the compartment 26.

If the temperature at the thermostat 31 in the vessel 32 rises, the outflow nozzle 30a is choked to a certain degree by the valve 30 connected with the thermostat, whereby the resistance to outflow of the air from the pipe 28 is increased. The air pressure then rises in the air dome 35, whereby the level in the air dome and thus also the float sink and the latter displaces the slide 7 by means of the lever transmission. The apertures 10 in the rotatable sleeve are now laid free so that oil flows into the pressure cylinder 14, the piston 15 being displaced downwards some distance, resulting in the control valve 19 being choked a little so that the flow of the hot liquid to the vessel 32 is reduced whereby the temperature sinks. While the piston 15 is displaced downwards, oil flows from the cylinder chamber 43 through the line 44 to the return chamber 37, although chambers 37 and 26 are interconnected, valve 18 throttles the flow from chamber 37 into overflow chamber 26, whereby the level in chamber 37 rises and thus also the level and the float in the air dome so that they come to the normal or equilibrium position, the slide 7 then being also displaced to its position of equilibrium so that the apertures 10 in the rotatable sleeve are closed. If the temperature in the vessel 32 continues to rise, the outflow nozzle 30a is still more choked by the thermostat valve 30, thereby raising still more the air pressure in the air dome 35 so that the level therein and the float sink below the position of equilibrium. This results in that the apertures 10 are opened and more oil flows into the pressure cylinder so that the piston therein is pressed still more downwards and the control valve 19 is further choked. Now still more oil flows from the cylinder chamber 43 to the return chamber 37, and the piston continues to move downwards until so much oil has flown into the return chamber that the level and the float in the air dome rise to the position of equilibrium, the level in the return chamber rising at the same time so much that it is in equilibrium with the higher air pressure in the air dome. When the control valve 19 has been choked so much that the temperature does not rise further at the thermostat but is still higher than the normal temperature corresponding to a higher air pressure in the air dome, the oil level in the return chamber is thus higher than normally (there is equilibrium between this air pressure and the oil column). Although the temperature is still too high no oil does thus flow into the pressure cylinder. Due to the reduced supply of the hotter liquid to the vessel 32 the temperature gradually sinks at the thermostat so that the distance is increased between the valve 30 and the outflow nozzle 30a, which results in a continuously reduced checking of the outflow of the air from the pipe line, the pressure in the air dome sinking more and more. This continues until the temperature is normal again when also the distance between the valve and the outflow nozzle is normal again. Meanwhile oil has flown out from the return chamber through the choke valve 18 to the constant level vessel so that the levels in the return chamber and in the said vessel will be in equilibrium.

The return speed is set by the choke valve 18 and is suited to the working conditions. Its position is correct when the level in the return chamber and the air pressure in the pipe line 28, and the air dome respectively, at the same time are in equilibrium after the control device has been in function.

When the temperature in the vessel 32 sinks under the normal value the same procedure is repeated, although in the opposite direction. The pressure in the pipe line 28 then sinks under the normal value, so that the float rises and displaces the slide 7 to the left, oil then flowing out from the pressure cylinder through the apertures 22 and the pipe line 23, the piston 15 being displaced upwards and the oil level in the return chamber sinking.

The above described embodiment is only cited by way of example. Thus, other devices may be used as servo-motors, e. g. a reversible electric motor, the relay actuating electric contacts of said motor. In this case the liquid for the hydraulic return movement may be actuated by a piston, membrane or the like which is connected with e. g. a lever for the control member 19 or some member for motion transmission from the servo-motor to the control member.

Instead of the valve 19 other control members may be used, e. g. rheostats or electric switches when an electric current is to be controlled.

Pressure fluid for pressure cylinders, membranes and so on may be taken from another pressure source than a pump. Instead of the shown slide valve another valve or some other member may be used.

The liquid in the return chamber may also be actuated indirectly by a separate cylinder, membrane or the like connected with the servo-motor, the control member 19 or some member transmitting the movement between the servo-motor and control member.

A piston, membrane, bellows or the like may be used in the relay instead of float. Some other liquid may be used instead of oil.

Different impulse members are used according to the objects to be controlled, e. g. electromagnet, Bourdon tube, float, impulse member for speed, moisture and so on.

The details may also be modified in many other respects in comparison with what has been described above and disclosed on the drawing without going beyond the scope of the invention.

Having now described my invention, what I claim as new and desire to secure by Letters Patent is:

1. A control device with a gentle return and with an impulse member independent thereof, comprising a relay, the said impulse member by means of fluid pressure actuating the relay in one direction, control means, the relay actuating a servo-motor device for regulation of the control means, the said relay consisting of an air dome provided with a float and at least one open return chamber communicating with the said dome, the said relay being furthermore adapted to be actuated by a liquid fluid in the direction opposite to said fluid pressure which fluid is actuated by and obtains its movement from the servomotor device, the return chamber communicating via an adjustable throttle valve with a vessel with means for keeping a substantially constant liquid level therein.

2. A device as claimed in claim 1 said servomotor device consisting of a pressure cylinder with piston and a pump connected therewith via a valve device, an automatic overflow valve, the pressure pipe of the pump being connected with the constant level vessel via the automatic overflow valve.

3. A device as claimed in claim 2, in which the return chamber communicates with the pressure cylinder.

4. A device as claimed in claim 1, a rod controlling the servo-motor device and connected with the float, said rod passing through a pipe passing through the return chamber and extending above its liquid level, a second pipe displaceably located around the rod and the float, said second pipe being closed at the top and open at the bottom beneath the level of the liquid fluid in the air dome.

5. A device as claimed in claim 1, including a motor-driven rotatable sleeve, a second slide displaceably mounted in said sleeve, said relay actuating the said servo-motor by means of said second slide, and an outer casing in which said sleeve is located, said sleeve being provided with apertures corresponding to liquid passages in said slide and in said casing.

ERIK SÄLL.

REFERENCES CITED

The following references are of record in the file of this patent:

UNITED STATES PATENTS

| Number | Name | Date |
|---|---|---|
| 2,012,978 | Veenschoten | Sept. 3, 1935 |
| 2,117,891 | Kalin | May 17, 1938 |
| 2,320,508 | Burns | June 1, 1943 |